United States Patent
Kusumi

(10) Patent No.: US 8,205,875 B2
(45) Date of Patent: Jun. 26, 2012

(54) FUNCTIONAL UNIT POSITIONING DEVICE AND IMAGE FORMING APPARATUS

(75) Inventor: Tadashi Kusumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1277 days.

(21) Appl. No.: 11/874,507

(22) Filed: Oct. 18, 2007

(65) Prior Publication Data

US 2008/0117482 A1    May 22, 2008

(30) Foreign Application Priority Data

Nov. 16, 2006   (JP) .................................. 2006-310263

(51) Int. Cl.
*B65H 1/22* (2006.01)
(52) U.S. Cl. ...................... 271/164; 271/162; 312/319.1
(58) Field of Classification Search .................. 271/145, 271/162, 164; 312/332.1, 319.1, 9.57, 9.63, 312/333

See application file for complete search history.

(56) References Cited

U.S. PATENT DOCUMENTS

| | | | | |
|---|---|---|---|---|
| 4,603,239 A | * | 7/1986 | Ishii | ........................... 200/61.61 |
| 5,294,106 A | * | 3/1994 | Takagi et al. | ................. 271/164 |
| 2007/0001380 A1 | | 1/2007 | Kusumi | |

FOREIGN PATENT DOCUMENTS

| | | |
|---|---|---|
| JP | 3-46433 | 4/1991 |
| JP | 3-46466 | 4/1991 |
| JP | 9-12164 | 1/1997 |
| JP | 2005-104697 | 4/2005 |
| JP | 2007-8720 | 1/2007 |

* cited by examiner

*Primary Examiner* — Michael McCullough
(74) *Attorney, Agent, or Firm* — Oblon, Spivak, McClelland, Maier & Neustadt, L.L.P.

(57) ABSTRACT

A functional unit positioning device for positioning a functional unit detachably attachable to an apparatus body, includes a biasing device that biases the functional unit in a unit-out direction; and a stopper mechanism having a first stopper and a second stopper, the stopper mechanism exerting and releasing control over release of the functional unit. The biasing device biases the functional unit by the biasing device so that the second stopper comes in contact with the first stopper to set the functional unit in a locked position in a unit in-out direction. The biasing device is also configured to change the magnitude of a bias force on the functional unit from low to high when the functional unit is inserted and advanced up to a predetermined position into the apparatus body.

15 Claims, 7 Drawing Sheets

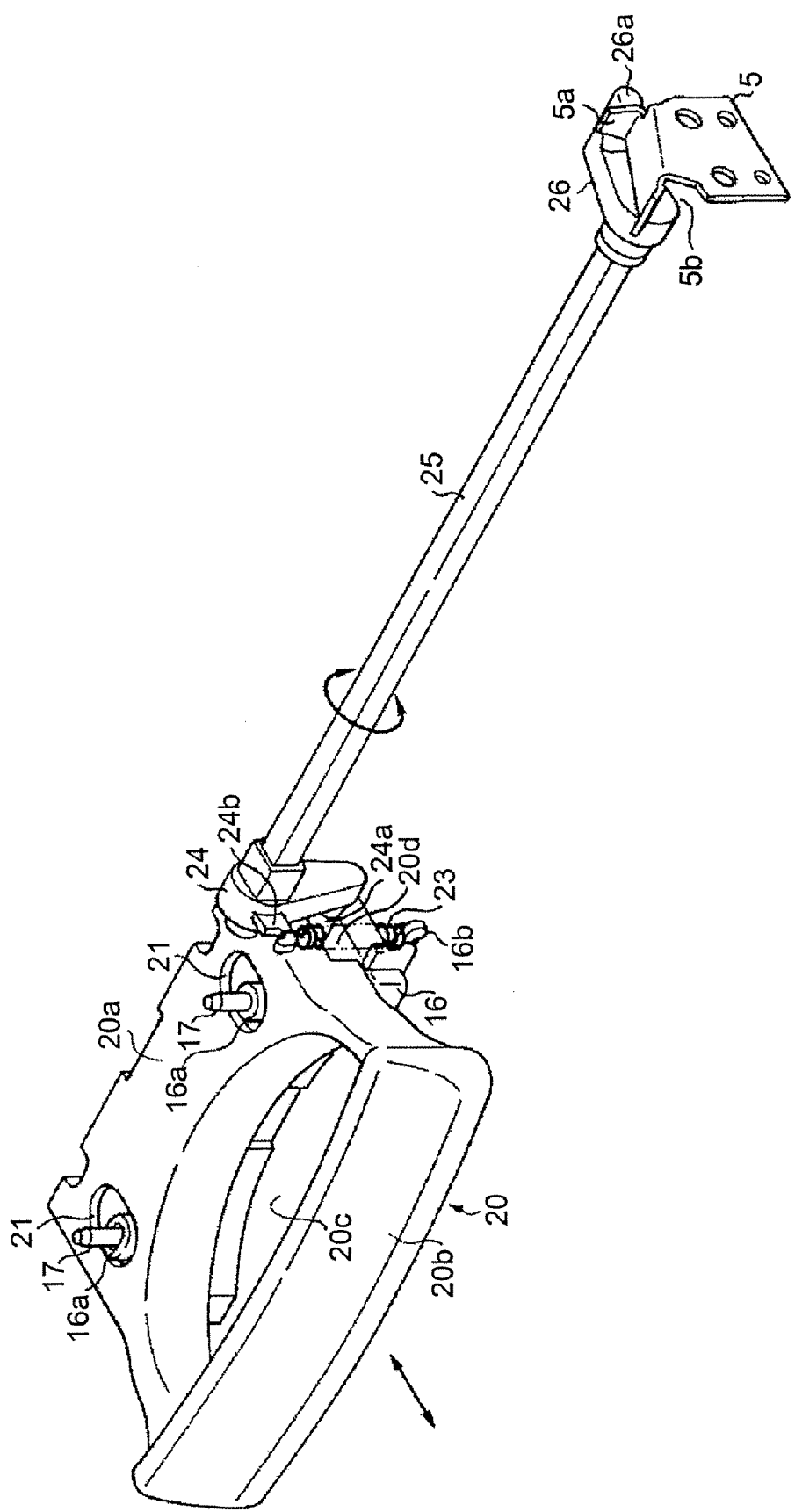

STRUCTURE ACCORDING TO
PRESENT EMBODIMENT
FIG.9B
CONVENTIONAL
STRUCTURE
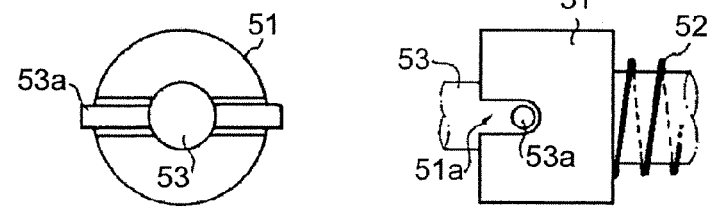

Related Art

FUNCTIONAL UNIT POSITIONING DEVICE AND IMAGE FORMING APPARATUS

CROSS-REFERENCE TO RELATED APPLICATIONS

The present application claims priority to and incorporates by reference the entire contents of Japanese priority document, 2006-310263 filed in Japan on Nov. 16, 2006.

BACKGROUND OF THE INVENTION

1. Field of the Invention

The present invention relates to a functional unit positioning device that positions and locks a device or a functional unit, such as a cassette containing a recording medium or a process cartridge, which is detachably attachable to an image forming apparatus body, at a predetermined position in the image forming apparatus body, and an image forming apparatus.

2. Description of the Related Art

It is common to detachably attach various functional units to the main body of image forming apparatuses such as electronic copying machines, printers, and facsimile machines. The image forming apparatus includes a sheet cassette containing recording medium such as transfer sheets. For example, Japanese Utility Model Application Laid-open No. H3-46466 and Japanese Patent Application Laid-open No. 2005-104697 disclose such image forming apparatuses.

FIG. 11 is a plan view of a cassette attachment unit of a conventional image forming apparatus. A locking unit 200 is provided between a paper feeding cassette 211 (hereinafter, "cassette") and an image forming apparatus body (hereinafter, "apparatus body") 210 for setting the cassette 211 in a predetermined locked position in the apparatus body 210. FIG. 12 is a plan view of a common locking unit for locking the cassette 211. The locking unit 200 includes a catch mechanism 204 and a locking pawl 205 that engages into the catch mechanism 204. The catch mechanism is a Y-shaped member with a pair of flexible arms 201 and a roller 203 at the end of each of the arms 201. The roller 203 is pivotable around a shaft 202. The locking unit 200 described above needs to have a relatively strong locking force to set the cassette 211 in the predetermined locked position.

A coupling member 251 and a spring 252 are also provided between the apparatus body 210 and the cassette 211. The coupling member 251 conveys a driving force from a driving unit (motor) 250 provided in the apparatus body 210 towards the cassette 211 to turn a base plate 212 provided inside the cassette 211. The spring 252 is attached to a drive shaft 253 of the motor 250 and biases the coupling member 251 towards the cassette 211. The cassette 211 is thus set in the apparatus body 210 in this locked position by the locking unit 200.

The locking unit 200 needs to have enough locking force to securely lock the cassette 211 against an opposing force imposed on the cassette 211 by the coupling member 251 and the spring 252. At the same time, the locking unit 200 needs to have a clamping force for drawing and locking in place the fully loaded cassette 211. Accordingly, the operating force required for locking the cassette in position would include a force required to push and widen the Y-shaped catch mechanism 204 against the clamping force of the locking unit 200 in addition to the force that needs to be exerted against the force exerted on the cassette 211 by the coupling member 251 and the spring 252. The operating force required for locking the fully loaded cassette 211 into place would be a force of about 15 to 20 Newton to counter the opposing force from the spring 252, etc., and about 30 to 50 Newton to counter the force of the catch mechanism 204. When pulling out the cassette 211, however, the opposing force imposed by the spring 252, etc. will not affect the operating force, as the coupling member 251 is in an engaged state.

However, in order for the catch mechanism 204 to exert increased pulling force with the slightest push, a retraction-end cam shape 205a has been given a sharper angle than a locking-end cam shape 205b. Consequently, more force will be required for countering the catch mechanism 204 than for locking. Therefore, the operating force required for pulling out the cassette 211 will be substantially the same as for locking the cassette 211 into place due to the retraction-end cam shape 205a.

With the advent of the barrier-free trend and universal design, manufactures have been requested to produce machines or tools having improved accessibility for people with disabilities. For example, the United States Government published Accessibility Standard stipulated in Section 508 of the Rehabilitation Act in December, 2000. According to the Accessibility Standard, the maximum operating force for a device or key operation must be 5 pounds weight (22.2 Newton). Thus, the manufactures are required to produce such machines with improved accessibility on the assumption that people with disabilities are employed in any offices.

Accordingly, it is desirable that the operator can insert the cassette into the apparatus body and pull out the cassette from the apparatus body with less operating force. However, the operating force required in the conventional devices is far too high to be deemed acceptable.

The operating force needs to be reduced for not just the cassette but a myriad of other parts such as process cartridge, developer unit, fixing device, toner bottle/toner cartridge, etc. that are detachably attachable to the apparatus body.

However, in the conventional image forming apparatuses, reduced operating force for inserting or removing functional units, etc. translates to inaccurate positioning of the function units. Reduced operating force is desirable for inserting and removing functional units from other devices as well, apart from image forming apparatus.

SUMMARY OF THE INVENTION

It is an object of the present invention to at least partially solve the problems in the conventional technology.

According to an aspect of the present invention, a functional unit positioning device for positioning a functional unit detachably attachable to an apparatus body, includes a biasing device that biases the functional unit in a unit-out direction; and a stopper mechanism having a first stopper and a second stopper. The stopper mechanism exerts and releases control over release of the functional unit. The biasing device biases the functional unit by the biasing device so that the second stopper comes in contact with the first stopper to set the functional unit in a locked position in a unit in-out direction. The biasing device is also configured to change the magnitude of a bias force on the functional unit from low to high when the functional unit is inserted and advanced up to a predetermined position into the apparatus body.

According to another aspect of present invention, an image forming apparatus includes a functional unit detachably attachable to the image forming apparatus; a biasing device that biases the functional unit in a unit-out direction; and a stopper mechanism having a first stopper and a second stopper, the stopper mechanism exerting and releasing control over release of the functional unit. The biasing device biases the functional unit by the biasing device so that the second stopper comes in contact with the first stopper to set the functional unit in a locked position in a unit in-out direction. The biasing device is also configured to change the magnitude of a bias force on the functional unit from low to high when the functional unit is inserted and advanced up to a predetermined position into the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a perspective view of parts around a handle of the paper feeding cassette;

FIG. 9B is a set of elevation view and side view of a conventional coupling member;

DETAILED DESCRIPTION OF THE PREFERRED EMBODIMENTS

Exemplary embodiments of the present invention are described below with reference to the accompanying drawings.

Figure 1:
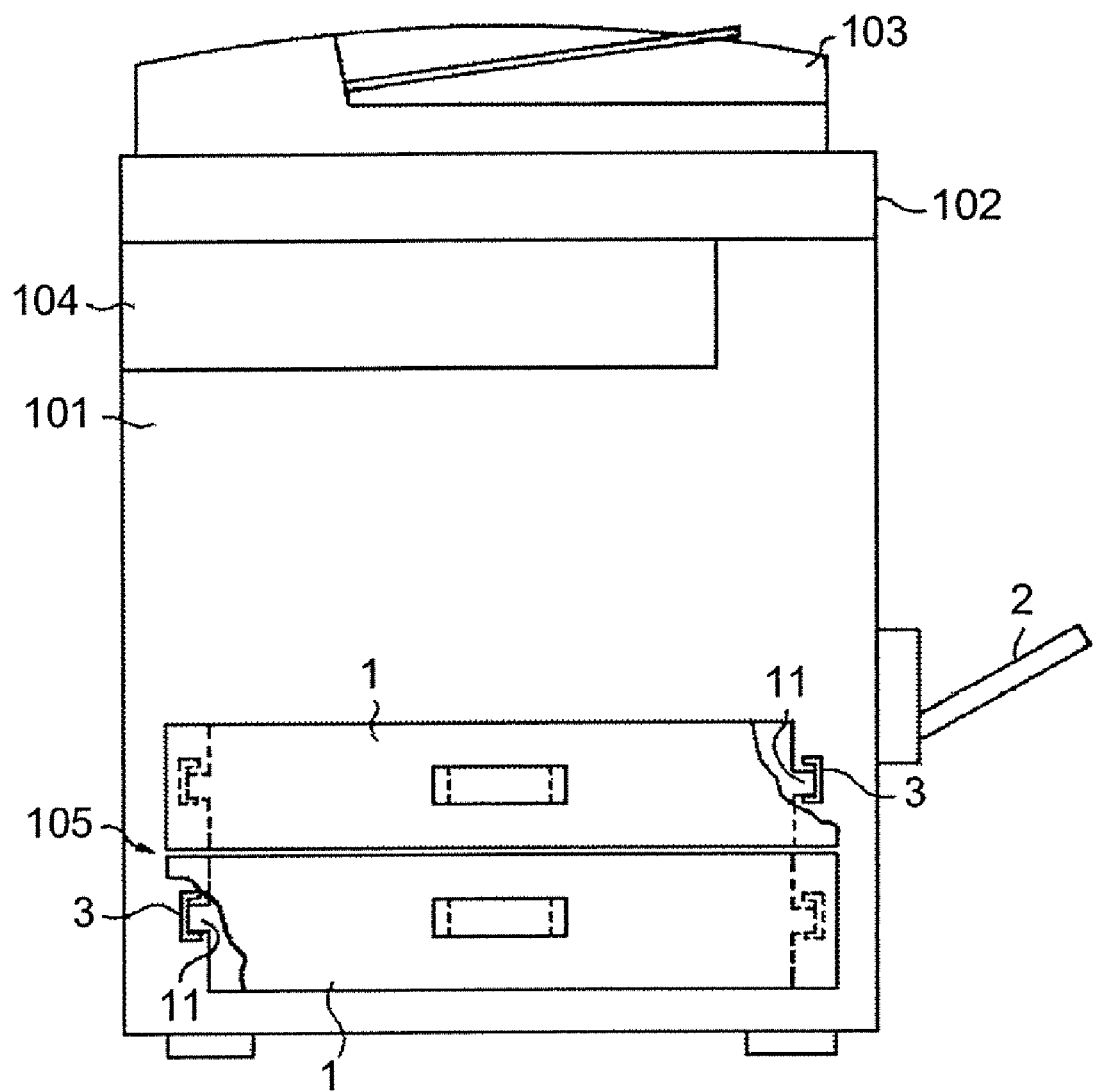
FIG. 1 is an elevation view of an image forming apparatus to which the present invention is applied.

FIG. 1 is an elevation view of an image forming apparatus to which the present invention is applied. The image forming apparatus is configured as a digital copier that includes an image forming apparatus body (hereinafter, "apparatus body") 101 and a scanner 102 atop the apparatus body 101. An automatic document feeder (ADF) 103 sits on the scanner 102. A not shown imaging unit is disposed in the mid portion of the apparatus body 101. A paper output unit (paper collating unit) 104 is provided between the apparatus body 101 and the scanner 102. A sheet feeding unit 105 is provided below the apparatus body 101. The sheet feeding unit 105 contains two paper feeding cassettes 1 and 1, each of which contains recording material. A manual tray 2 is provided on one of the side faces of the apparatus body 101.

Image formation in the image forming apparatus described above takes place by a known electro photographic process as described below. The surface of a photosensitive member is charged by a charging unit. An electrostatic latent image is formed on the charged surface of the photosensitive member by irradiation from an optical writing device. The electrostatic latent image is converted into a visible toner image by a developing device. The toner image on the photosensitive member is transferred to a recording sheet supplied selectively from either the paper feeding cassettes 1, 1, or the manual tray 2. The toner image on the recording sheet is fixed by a fixing device. Then, the recording sheet with the fixed image is discharged into the paper output unit 104.

Figure 2:
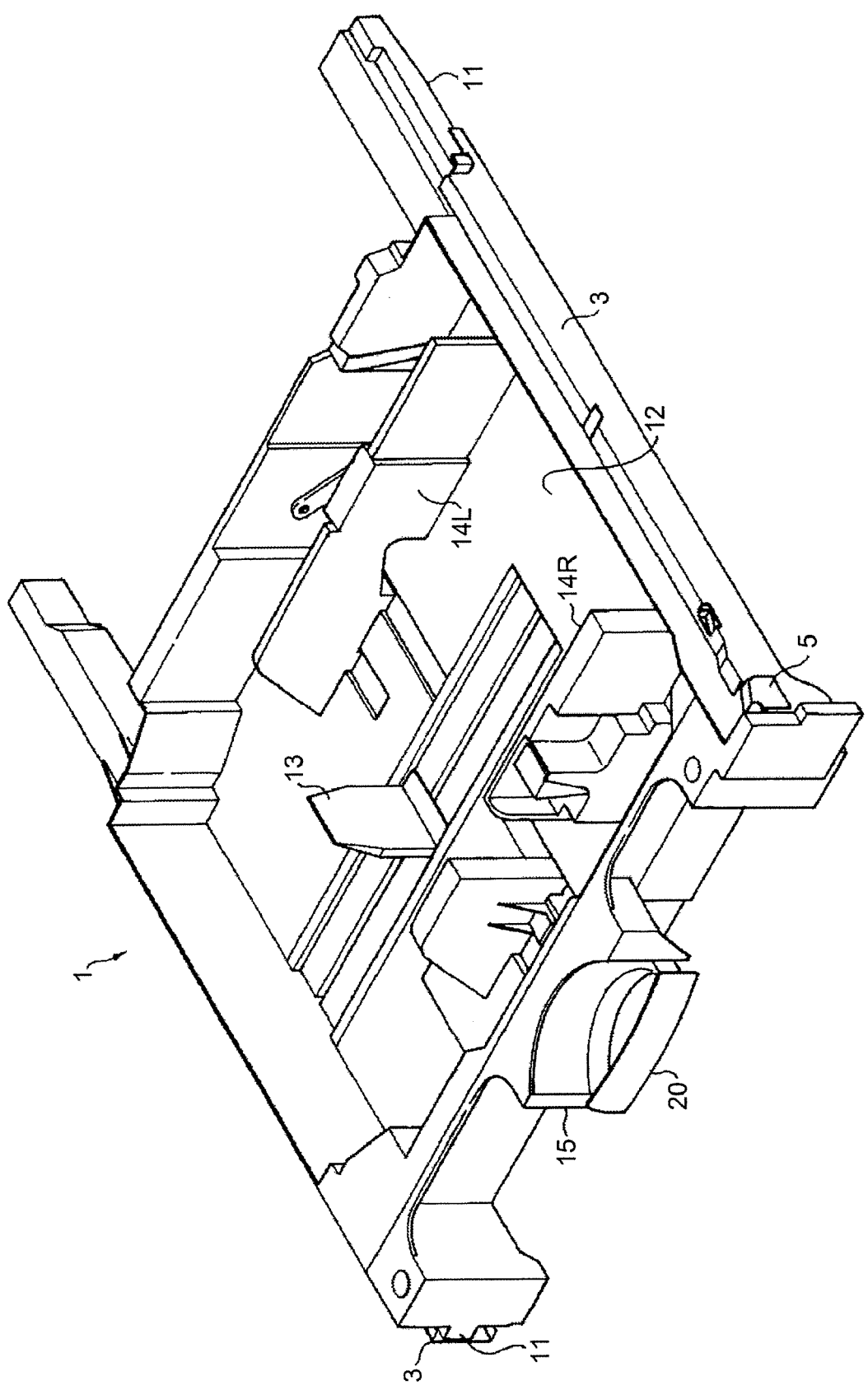
FIG. 2 is a perspective view of a paper feeding cassette and guide rails.

FIG. 2 is a perspective view of the paper feeding cassette (hereinafter, "cassette") 1 and guide rails 3.

As shown in FIG. 2 as well as FIG. 1, the cassette 1 has protruding members 11 and 11, one protruding from each side face of the cassette 1. The protruding members 11 and 11 are supported by the guide rails 3 and 3 provided on the apparatus body 101, enabling the cassette 1 to be pulled out (towards the front of the apparatus body 101) or inserted into the apparatus body 101, perpendicular to a recording sheet conveyance direction. The cassette 1 internally includes a movable base plate 12 that thrusts up the recording sheet contained in the cassette, an end fence 13 that supports the rear edge of the recording sheet, and a pair of side guides 14L and 14R that support the side edges of the recording sheet. The guide rail 3 on the side of the leading end of the recording sheet conveyance direction has a first stopper 5 at its front end that serves as a positioning member for positioning the cassette 1.

A handle supporting unit 15 is provided in the mid portion of the front face of the cassette 1, and a handle 20 is fixed to the handle supporting unit 15. The handle 20 is supported so as to be movable in a cassette in-out direction. The handle supporting unit 15 controls the lateral (that is, in the direction of sheet conveyance) and upward movement of the cassette 1. A cover member 16 described later controls the downward movement of the cassette 1.

FIG. 3 is a perspective view of the handle 20 and the parts around the handle 20 of the cassette 1.

As shown in FIG. 3, the handle 20 includes a base portion 20a and a handle portion 20b with a space 20c separating the base portion 20a and the handle portion 20b. The cover member 16 disposed below the base portion 20a of the handle 20 is part of the cassette 1. Two boss members 16a and 16a protrude from the surface of the cover member 16. Each boss member 16a has a through hole in the vertical direction, with a screw 17 inserted through the through hole from below. The handle supporting unit 15 of the cassette body is screwed on to the cover member 16 by the screws 17 and 17.

Two elongated slots 21 and 21 are provided in the base portion 20a of the handle 20. The boss members 16a and 16a of the cover member 16 pass through the elongated slots 21 and 21. The base portion 20a of the handle 20 is thus disposed between the handle supporting unit 15 of the cassette body and the cover member 16, with the handle 20 attached to the body of the cassette 1. The short-radial diameter of the elongated slot 21 of the handle 20 is only slightly larger than the external diameter of the boss member 16a (to accommodate the play due to shaking) and the long-radial diameter is larger than the external diameter of the boss member 16a by a predetermined magnitude.

The configuration described above renders the handle 20 movable only in the cassette in-out direction (in the direction indicated by the double-headed arrow in FIG. 3). The scope of movement of the handle 20 is restricted by the elongated slots 21 and 21 and the boss members 16a and 16a.

A shaft 25 is rotatably supported on the front face of the cassette body. A lever 24 having a tip end and a base end is fixed to the end of the shaft 25 on the side of the handle 20. A projection member 24a formed on the side face of the lever 24 at the tip end fits into a groove member 20d formed on the side face of the handle 20. A hook member 24b is provided on the side face of the lever 24 at the base end. Another hook member 16b is provided on the cover member 16. A spring 23 is hooked to and stretched between the hook members 24b and 16b. The lever 24 is biased in a counter-clockwise direction in FIG. 3 due to the elastic force of the spring 23, causing the side face of the projection member 24a on the interior side to press tightly against the side face of the groove member 20d on the interior side, thereby biasing the handle 20 towards the cassette-in direction (towards the interior of the apparatus body 101) of the cassette 1. When the handle 20 is pulled in the cassette-out direction against the bias force of the spring 23, the side face of the groove member 20d on the interior side pushes the side face of the projection member 24a on the interior side, causing the lever 24 (and the shaft 25) to turn clockwise.

Figure 4A:
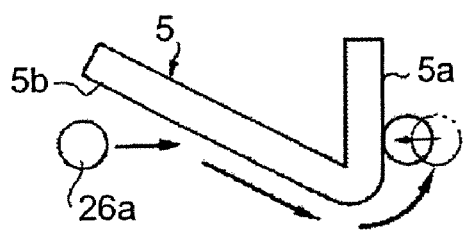
FIGS. 4A and 4B are schematics for explaining the functioning of a stopper mechanism.
Figure 4B:
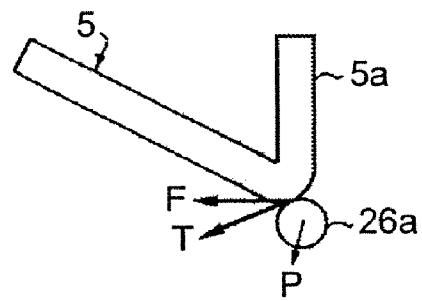

An outer lever 26 having a tip end and a base end is fixed to the opposite end of the shaft 25. A second stopper 26a that projects towards the side face of the cassette body is provided at the tip end of the outer lever 26. The lever 24 and the outer lever 26 are fitted to the shaft 25 at a predetermined angle (90° in the example shown in FIG. 3) in relation to each other. As shown in FIG. 3, when the lever 24 is oriented downward, the outer lever 26 is oriented towards the interior of the cassette body. In FIG. 3, the cassette 1 is shown inserted into the apparatus body 101. In this position, the second stopper 26a of the outer lever 26 comes up against a stopper surface 5a extending above the first stopper 5 on the interior side. FIGS. 4A and 4B are schematics for explaining the relation between the first stopper 5 and the second stopper 26a (partially shown) when viewed from the side face of the cassette body. When the cassette 1 is inserted into the apparatus body 101, the cassette 1 is pushed back towards the front face of the image forming apparatus (in the cassette-out direction), causing the second stopper 26a of the outer lever 26 to come up against the stopper surface 5a of the first stopper 5. Thus, the cassette 1 is positioned and locked in that position.

If the handle 20 is pulled when the cassette 1 is set in the locked position in the apparatus body 101, the lever 24, the shaft 25, and the outer lever 26 will turn clockwise from the positions shown in FIG. 3, causing the second stopper 26a of the outer lever 26 to move downwards and away from the stopper surface 5a. Thus, the locked condition is released and the cassette 1 can be pulled out. Further, when the handle 20 is pulled, the far end of the elongated slots 21 and 21 come in contact with the boss members 16a and 16a, pressing them towards the cassette-out direction, thus causing the cassette to be pulled out.

When the cassette 1 is inserted into the apparatus body 101, as shown in FIG. 4A, the second stopper 26a of the outer lever 26 comes in contact with a guide surface 5b of the first stopper 5. As the cassette 1 is inserted further in, the second stopper 26a presses against the guide surface 5b and moves downwards (the outer lever 26 turns clockwise in FIG. 3). In other words, as the cassette 1 is inserted further in, the second stopper 26a moves guided along the guide surface 5b. When the second stopper 26a crosses the bottom end (the corner) of the guide surface 5b, the bias force of the spring 23 causes the outer lever 26 to turn counter clockwise. As a result, the second stopper 26a slides to the stopper surface 5a side to function as a stopper.

Figure 5:
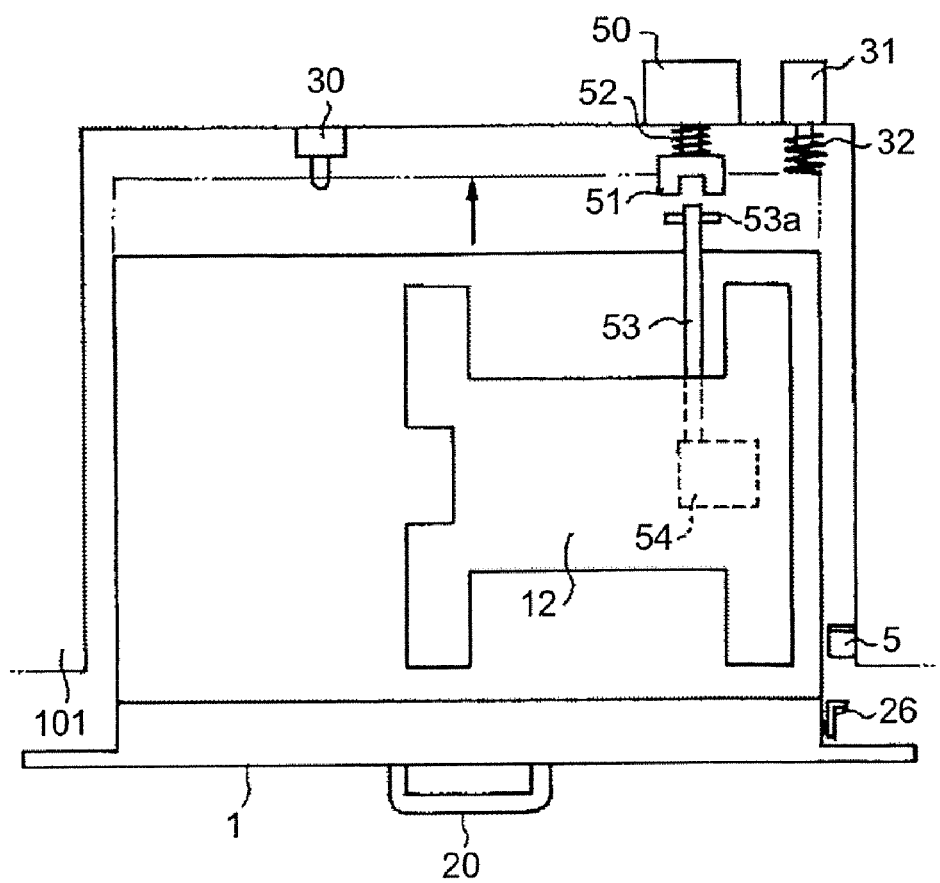
FIG. 5 is a plan view of the paper feeding cassette inserted into an image forming apparatus body.

FIG. 5 is a plan view of the cassette 1 inserted into the apparatus body 101. The apparatus body 101 includes a hoisting motor 50, a coupling member 51 that transmits a driving force from the hoisting motor 50 to the cassette 1, and a spring 52 wound around an output shaft of the hoisting motor 50 that biases the coupling member 51 towards the cassette 1. The output shaft of the hoisting motor 50 is capable of extending and retreating in the shaft direction, causing the coupling member 51 attached at its end to move in the cassette in-out direction. On the side of the cassette 1 a rotating shaft 53 is provided facing the coupling member 51, which has an engaging lug 53a at its end on the interior side that engages into the coupling member 51. A thrusting member 54 is fixed to the opposite end of the rotating shaft 53. The thrusting member 54 thrusts up the base plate 12, causing the recording sheet to be thrust into not shown paper feed rollers.

The apparatus body 101 also includes a cassette-insertion detecting unit 30 that detects the paper feeding cassette 1 when it is inserted into the apparatus body 101. The apparatus body 101 further includes a biasing device that includes a solenoid 31 and a compression spring 32. The solenoid 31 has an arm 31a (see FIG. 6) that is capable of extending and retreating in the cassette in-out direction. The compression spring 32 is attached at the end of the arm 31a. The biasing device exerts a bias force that moves the cassette 1 in the cassette-out direction. The solenoid 31, which serves as the biasing unit, is capable of changing (switching) the bias force from on to off and vice versa. The bias force exerted by the biasing device is directed such that it causes the second stopper 26a to come up against the stopper surface 5a of the first stopper 5.

When the cassette 1 is inserted into the apparatus body 101, the cassette-insertion detecting unit 30 detects it. In response, the solenoid 31 is turned on and the arm 31a extends, causing the compression spring 32 to touch and press against the face of the cassette 1 on the interior side and to push the cassette 1 in the cassette-out direction (that is, towards the front face of the apparatus body 101). With reference to FIG. 4A, the action of the solenoid 31 pushing the cassette 1 in the cassette-out direction causes the second stopper 26a (represented by dashed circle), which has slid to the stopper surface 5a side, to be pushed against the stopper surface 5a. Thus, the cassette 1 is positioned in the cassette in-out direction (that is, the antero-posterior direction of the apparatus body 101 or perpendicular to the recording sheet conveyance direction). The solenoid 31 is set to exert a bias force that is greater than the force required to move the fully loaded cassette 1 to a stopper position (that is, the position at which the second stopper 26a comes in contact with the stopper surface 5a).

When the cassette 1 is pulled out, the cassette-insertion detecting unit 30 detects that the cassette 1 is being pulled out from the apparatus body 101. In response, the solenoid 31 is turned off, causing the arm 31a to retract. As a result, the compression spring 32 retracts to a retracted position (a position at which the tip of the compression spring 32 does not touch the cassette 1 when fitting in the cassette). When in the retracted position, the compression spring 32 does not offer resistance when the cassette 1 is inserted.

If the solenoid 31 is equipped with an arm locking function (which enables the arm 31a to remain extended even after power supply is stopped), it can be configured to be turned off after the cassette 1 moves to the stopper position during insertion. In this case, when the cassette-insertion detecting unit 30 detects that the cassette 1 has been pulled out, the solenoid is switched on once and then off after the arm 31a is retracted.

The cassette-insertion detecting unit 30 can be a mechanical sensor such as a bush switch or an optical sensor such as a photo sensor. Apart from the solenoid 31, a structure using a motor, etc. can be used as the biasing unit that moves the cassette 1 to the stopper position. The cassette-insertion detecting unit 30 and the solenoid 31 can also be provided on the side of the cassette 1. However, in that case, the structure should be configured so that power supply to the solenoid 31 is possible.

The actions of the second stopper 26a of the outer lever 26 and the first stopper 5 are described with reference to FIGS. 4A and 4B.

FIG. 4A is a drawing of the second stopper 26a of the outer lever 26 and the first stopper 5 during insertion of the cassette 1. When the second stopper 26a of the outer lever 26 comes in contact with the guide surface 5b of the first stopper 5, the outer lever 26 turns and is gently guided along the guide surface 5b until the outer lever 26 crosses the tip (corner). The outer lever 26 then turns in the opposite direction, the second stopper 26a returning to its original height. The cassette 1 is pushed back by the biasing unit (the solenoid 31) to the extent of overstroke, causing the second stopper 26a to come up against the stopper surface 5a of the first stopper 5 and setting the cassette 1 in the locked position.

If the solenoid 31 has a bias force just enough to cause the second stopper 26a come up against the stopper surface 5a, the bias force exerted by the solenoid 31 will not act on the cassette 1 if the second stopper 26a is outside the stopper surface 5a (that is, to the left side in FIGS. 4A and 4B). If the cassette 1 is inserted slowly under such a condition, the second stopper 26a may stop at the position shown in FIG. 4B (when the second stopper 26a is at this position, the solenoid 31 is not capable of pushing out the cassette 1). In this condition, the cassette-insertion detecting unit 30 will not be able to determine if the cassette 1 is set in the locked position in the apparatus body 101. If the image forming apparatus is used in this state, the cassette may get ejected while the image forming apparatus is in operation.

To avoid the half-inserted condition shown in FIG. 4B, the solenoid 31 in the present embodiment is set to have a bias force which is greater than the force required to move the fully loaded cassette 1 to a position where the cassette-insertion detecting unit 30 will not detect it. In other words, the solenoid 31 is set to have a bias force that can push the cassette 1 (which is fully loaded) from within the detection range of the cassette-insertion detecting unit 30 to outside the detection range (that is, towards the front face of the apparatus body 101). Specifically, in addition to the force required to move the fully loaded cassette 1 in the cassette-out direction (that is, force that enables the fully loaded cassette 1 to move in the cassette-out direction when the second stopper 26a and the stopper 5 are not in contact with each other), a force F equivalent to the component of resistance T of the second stopper 26a and the stopper 5 in the cassette-out direction as well as a force P, insignificant as it may be, that turns the outer lever 26 in the opposite direction, are required.

To achieve cassette positioning (by pushing the second stopper 26a against the stopper surface 5a), an elastic member such as a spring can be used as the biasing unit instead of the solenoid 31 to push back the cassette 1. However, the disadvantage of such a structure would be that the bias force cannot be turned on and off, nor can the magnitude of the bias force changed. Also, during cassette insertion, a force to counter the bias force (force required to push out the fully loaded cassette 1) exerted by the elastic member is required. This is not desirable from the viewpoint of reducing the operating force for cassette insertion, which is one of the objectives of the present invention. In the present embodiment, when the cassette 1 is inserted and advanced to a predetermined position, the biasing device (the solenoid 31 of the biasing device) is activated to exert a bias force, and hence the bias force used for cassette positioning does not oppose cassette insertion. As a result, cassette insertion can be done without any deterioration in the operability.

In the present embodiment, the compression spring 32 is configured to remain retreated and not come in contact with the interior face of the cassette 1 when the cassette 1 is at the position where the biasing device (that is, the solenoid 31 of the biasing device) is switched on (in other words, where the cassette-insertion detecting unit 30 detects the cassette 1). Consequently, the solenoid 31 is switched from on to off when the cassette 1 moves away from the biasing device. Therefore, only the bias force of the biasing device acts on the cassette 1 without the additional bias force of the compression spring 32 during cassette insertion. Hence no resistance is offered during cassette insertion. The same result can be achieved if the compression spring 32 is configured to come in contact with the interior face of the cassette 1 at a predetermined position (only the bias force of the compression spring 32 will act on the cassette 1 at this stage) by causing the solenoid 31 (of the biasing device) to be turned on (from off to on) after the cassette 1 comes in contact with the biasing device.

Figure 6:
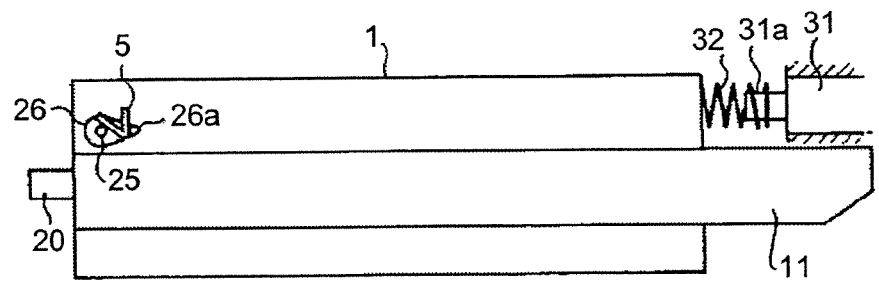
FIG. 6 is a schematic (side view) for explaining a positional relation between a biasing device and a stopper.
Figure 7:
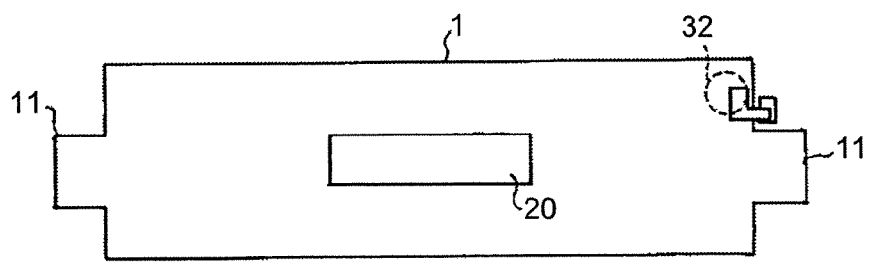
FIG. 7 is a schematic (elevation view) for explaining the positional relation between the biasing device and the stopper.

FIGS. 6 and 7 are schematics for explaining the positional relation between biasing device and the first stopper 5. FIG. 6 is a side view whereas FIG. 7 is an elevation view.

As shown in FIG. 6, the compression spring 32 that conveys the force of the solenoid 31 and the stopper surface 5a of the first stopper 5 are arranged such that they have substantially the same height. Further, as shown in FIG. 7, the compression spring 32 and the first stopper 5 are aligned in the breadth direction of the image forming apparatus (that is, laterally in FIG. 1). In other words, the point where the bias force of the solenoid 31 acts is substantially aligned with the point where the stopper surface 5a of the first stopper 5 is located on a projection surface in the cassette-in direction. Alignment on the projection surface of the position of bias force exertion of the solenoid 31 with the location of the stopper surface 5a can also be achieved by fitting brackets, etc. on the cassette 1.

Thus, the bias force of the solenoid 31 is directed towards the stopper surface 5a. Since the direction in which the bias force acts also happens to be the direction of movement of the cassette 1, practically no moment is produced in the cassette 1 due to the bias force. Consequently, the cassette 1 can be inserted into the apparatus body 101 without a slant.

A second embodiment of the present invention is described below. In the second embodiment, the biasing device that moves the cassette 1 is configured using a cassette base plate hoisting mechanism.

Figure 8:
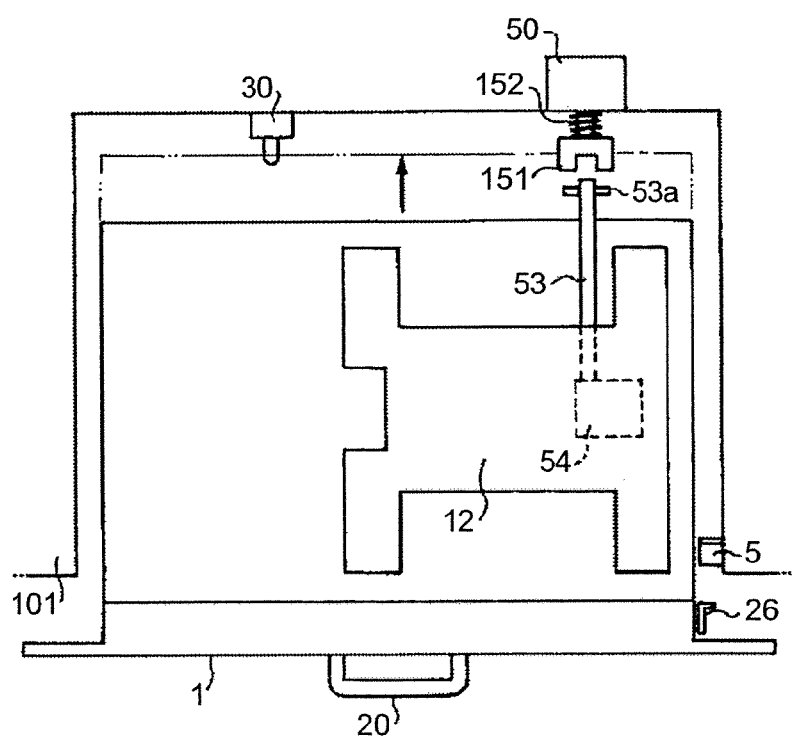
FIG. 8 is a plan view of the elements forming a cassette attachment unit according to a second embodiment of the present invention.

FIG. 8 is a plan view of the elements forming a cassette attachment unit according to the second embodiment for locking the cassette. The second embodiment differs from the first embodiment in that there is no biasing device (the solenoid 31 and the compression spring 32 shown in FIG. 5) provided to bias the cassette 1. Instead, the second embodiment has a coupling member 151 and a spring 152 that biases the coupling member 151 functioning as the cassette base plate hoisting mechanism. The first embodiment and the second embodiment are identical in other respects. The following description only explains the features that are unique to the second embodiment. The features that are common to the present and first embodiments will be omitted from the description.

The cassette 1 in the present embodiment is identical to the cassette 1 described in the first embodiment, and includes the base plate 12, the rotating shaft 53 having the engaging lug 53a, and the thrusting member 54, all of which are identical to those in the first embodiment.

Of the hoisting mechanism on the apparatus body side, the hoisting motor 50 is identical to that in the first embodiment shown in FIG. 5. However, the shape of the coupling member 151 differs from that of the coupling member 51 described in the first embodiment. The bias force of the spring (compression spring) 152 that biases the coupling member 151 in the cassette-out direction is set to a magnitude described later.

Figure 9A:
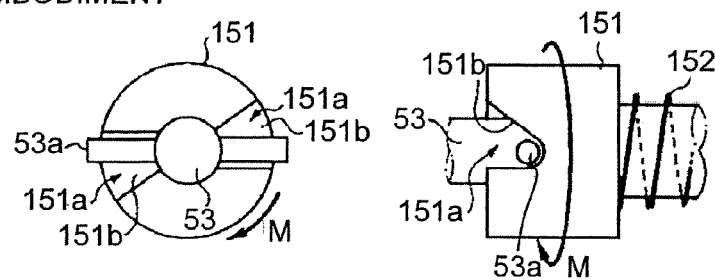
FIG. 9A is a set of elevation view and side view of a coupling member according to the second embodiment.

FIG. 9A is a set of elevation view and side view of the coupling member 151 according to the second embodiment. FIG. 9B is a set of elevation view and side view of the conventional coupling member 51. The conventional coupling member 51 (like the one used in the first embodiment shown in FIG. 5) has a notch 51a into which the engaging lug 53a of the rotating shaft 53 on the cassette side engages. The two wall faces of the notch 51a are parallel with the movement direction of the coupling member 51 (that is, parallel with the cassette in-out direction). The rotating movement of the coupling member 51 is transferred to the rotating shaft 53 due to the wall faces pressing the engaging lug 53a. With such a configuration, once engaged into the notch 51a of the coupling member 51, the engaging lug 53a just rotates without shifting its position in the cassette in-out direction even when the coupling member 51 rotates (in whichever direction).

On the other hand, the coupling member 151 has a notch 151a into which the engaging lug 53a of the rotating shaft 53 on the cassette side engages. However, while one wall face (that comes in contact with the engaging lug 53a when the coupling member 151 turns in a direction so as to thrust up the base plate 12 of the cassette 1) of the notch 151a is parallel with the movement direction of the coupling member 151 (that is, parallel with the cassette in-out direction), the other wall, which is a slanting face 151b (that comes in contact with the engaging lug 53a when the coupling member 151 turns in a direction so as to lower the base plate 12, which is the direction indicated by the arrow M in FIG. 9A) slants (forming a tapering face) in relation to the movement direction of the coupling member 151 (that is, in relation to the cassette in-out direction). With such a configuration, when the coupling member 151 rotates in the direction so as to lower the base plate 12 of the cassette 1 (that is, in the direction indicated by the arrow M), the slanting face 151b pushes out the engaging lug 16a in the direction of the shaft (that is, in the cassette-out direction).

In the cassette base plate hoisting mechanism described in the first embodiment, the bias force of the spring 52 that biases the coupling member 51 required is a magnitude just enough to move the coupling member 51 and the output shaft of the hoisting motor 50 to which the coupling member 51 is attached in order for the engaging lug 53a to engage into the notch 51a of the coupling member 51. However, in the second embodiment, it would be expected that the spring 152 is required to exert a bias force greater than the force required to move the fully loaded cassette 1. The reason for this is, if the bias force of the spring 152 is set to be less than the force required to move the fully loaded cassette 1, when the coupling member 151 with the engaging lug 16a engaged into it rotates so as to lower the base plate 12, the coupling member 151 gets pushed back to the interior of the device, and the cassette 1 does not get pushed out. If the bias force of the spring 152 matches the force required for moving the fully loaded cassette 1, the coupling member 151 does not get pushed back and the slanting face 151b pushes out the engaging lug 16a, in other words, the cassette 1. However, if the bias force of the spring 152 is set to be greater than the force required for moving the fully loaded cassette 1, the operability during cassette insertion will deteriorate. Hence, in the present embodiment, the bias force of the spring 152 is set to match (that is, the bias force is set substantially equal to) the magnitude required for moving the fully loaded cassette 1.

By virtue of this configuration, in the second embodiment, when the cassette-insertion detecting unit 30 detects that the cassette 1 is inserted into the apparatus body 101, a control is exerted to rotate the hoisting motor 50 downwards by a predetermined magnitude prior to the lifting operation of the base plate 12 (by the upward rotation of the hoisting motor 50). Thus, the cassette 1 is moved in the cassette-out direction, causing the second stopper 26a to come up against the stopper surface 5a to lock the cassette 1 in the cassette in-out direction without having to provide a separate biasing device (driving unit such as a solenoid, etc.) as in the first embodiment. In the present embodiment, when the cassette 1 is inserted and advanced to a predetermined position, the biasing device (which is the hoisting motor 50) is activated to exert a bias force, and hence the bias force used for cassette positioning does not oppose cassette insertion. As a result, cassette insertion can be done without any deterioration in the operability.

The predetermined downward rotation magnitude of the hoisting motor 50 prior to the lifting operation of the base plate 12 refers to the magnitude of rotation of the hoisting motor 50 until the second stopper 26a is pushed up against the stopper surface 5a after the engaging lug 53a engages in the notch 151a of the coupling member 151 (that is, the magnitude of rotation of the hoisting motor 50 until, after the engagement of the engaging lug 53a into the notch 151a, the pressure exerted by the slanting face 151b pushes the engaging lug 53a with the turning of the coupling member 151 in M direction till the cassette 1 is pushed back to the locked position). If the case prior to engagement of the engaging lug 53a in the notch 151a is considered, a maximum of a half-turn can be added to the rotation magnitude to include the rotation magnitude required for the engaging lug 53a to engage in the notch 151a. If a function for returning the coupling member 151 to home position (that is, when the engaging lug 53a is engaged in the notch 151a) is provided, the half-turn need not be added to the rotation magnitude.

If the cassette 1 is in the half-inserted condition (that is, not completely set) shown in FIG. 4B and the cassette-insertion detecting unit 30 detects the cassette 1, it will not be able to determine if the cassette 1 is set in the locked position in the apparatus body 101. To avoid the half-inserted condition, the downward rotation magnitude of the hoisting motor 50 prior to the lifting action of the base plate 12 can be increased so that the fully loaded cassette 1 can be moved to a position where the cassette-insertion detecting unit 30 will not detect it.

As a relatively large bias force can be obtained by the biasing device using the base plate hoisting mechanism according to the second embodiment, the cassette 1 can be pushed out effectively from the half-inserted condition (even if the cassette 1 is fully loaded), effectively preventing any faulty insertion condition of the cassette 1. Further, the component cost and power consumption are much less compared to using solenoid to obtain a comparable bias force.

In the second embodiment, the biasing device is formed by the hoisting motor 50, the spring 152, and the coupling member 151, where the hoisting motor 50 exerts a bias force to rotate the coupling member 151 downwards to move the cassette 1 in the cassette-out direction. The hoisting motor 50, which serves as the biasing unit, is capable of changing (switching) the bias force from on to off and vice versa.

Figure 10:
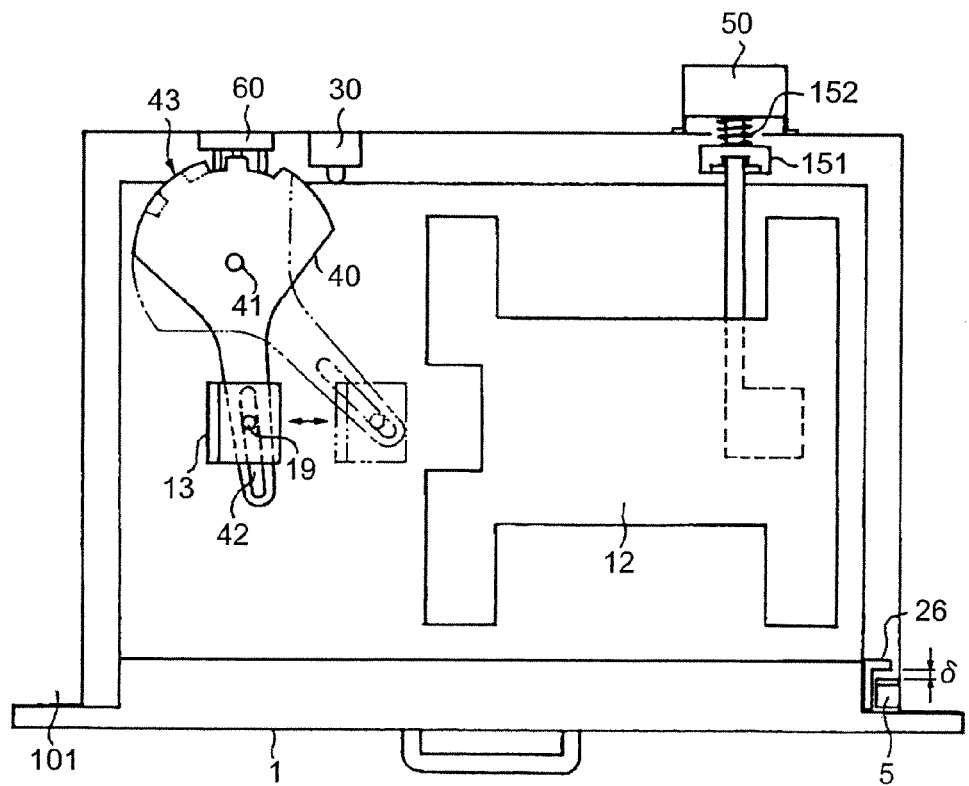
FIG. 10 is a plan view of the elements forming a cassette attachment unit according to a third embodiment of the present invention.
Figure 11:
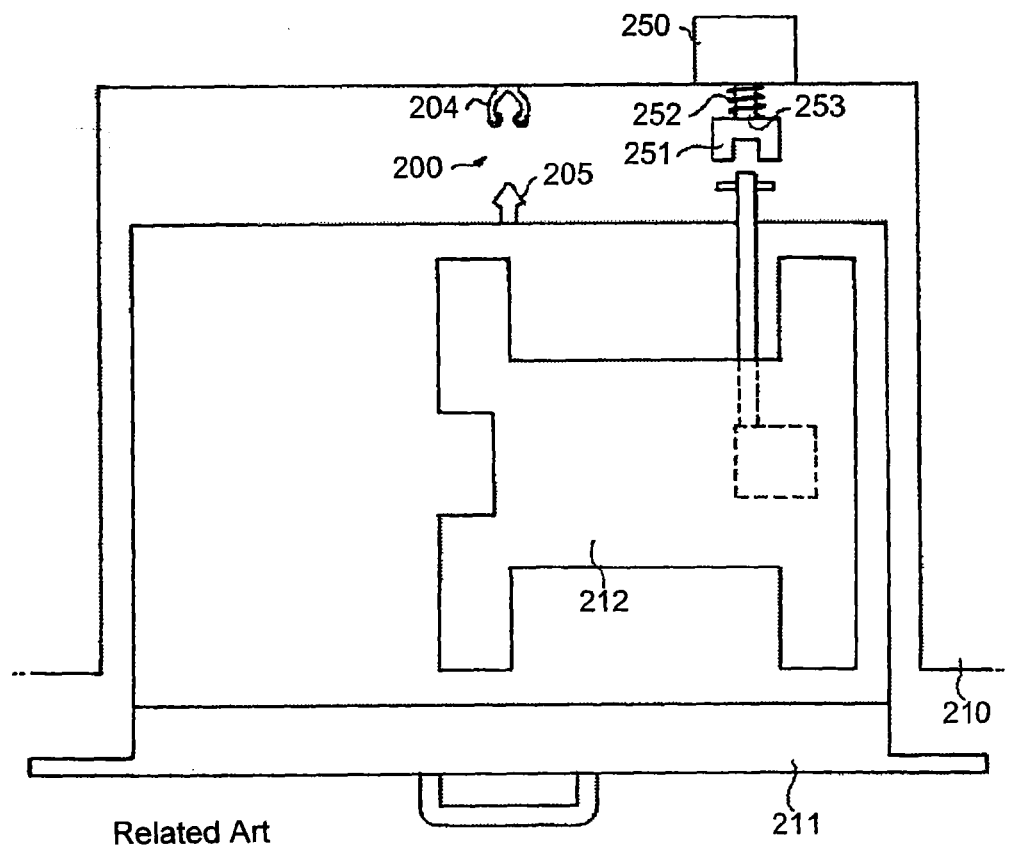
FIG. 11 is a plan view of a cassette attachment unit of a conventional image forming apparatus.
Figure 12:
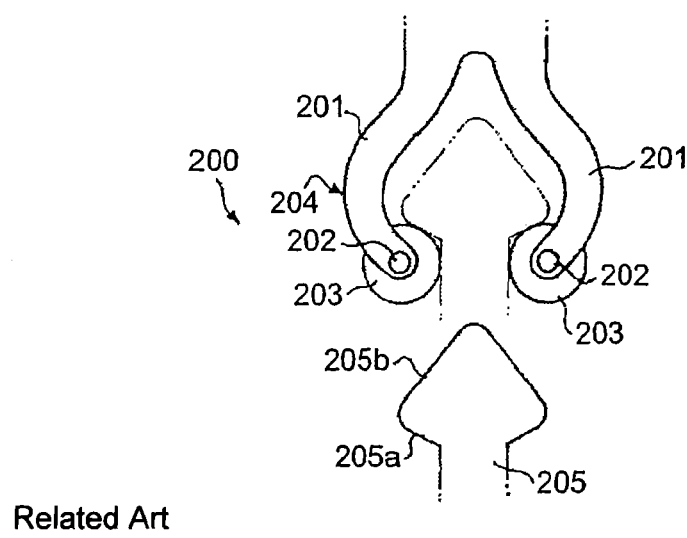
FIG. 12 is a plan view of a conventional locking unit for locking the cassette shown in FIG. 11.

FIG. 10 is a plan view of the elements forming a cassette attachment unit according to a third embodiment of the present invention. In the third embodiment, a paper size detecting mechanism of mechanical link type is used.

There are various types of paper size detecting mechanism, including optical sensor, that detect the size of the recording sheet loaded in a cassette. However, mechanical link type paper size detecting mechanism that uses a link member that shifts according the end fence the supports the rear edge of the recording sheet is the least expensive of them all.

As shown in FIG. 10, the end fence 13 of the cassette 1 (see also FIG. 2) has a lug 19 on its back face. A link member 40 that is supported to rotate about a spindle 41 is provided on the bottom of the cassette 1. The link member 40 is elongated at one end. The elongated end of the link member 40 has a slit 42 extending from the tip towards the spindle 41. The lug 19 on the back face of the end fence 13 fits into the slit 42, enabling the link member 40 to swing as the end fence 13 shifts. The edge opposite to the elongated end of the link member 40 with the slit 42 is arc-shaped. A plurality of notches, two in the present embodiment, is provided on the edge to form a contoured detecting unit 43. A paper-size detecting unit 60 with push switches arranged in a line is provided in alignment with the detecting unit 43 of the link member 40 in the cassette attachment unit of the apparatus body 101.

When the link member 40 swings as the end fence 13 shifts, the position of the contour of the detecting unit 43 (detection pattern) changes, as shown by solid line and dashed line in FIG. 10. The change in the contour of the detecting unit 43 changes the combination of on/off status of the push switches of the paper-size detecting unit 60 by which the paper size is detected.

Though the mechanical link type paper size detecting mechanism may be inexpensive, its accuracy is questionable as the extent to which the push switches of the paper-size detecting unit 60 are pushed varies because of the arc shape (cylindrical shape) of the detecting surface. When the cassette 1 is inserted into the apparatus body 101 (but is yet to be locked into position), a gap 6 exists between the second stopper 26a of the outer lever 26 of the cassette 1 and the stopper surface 5a of the first stopper 5 of the apparatus body 101 due to overstroke. As the cassette 1 is not yet locked into position, the extent to which the push switches of the paper-size detecting unit 60 are pushed will be different from the actual extent to which they will be pushed where the cassette 1 to be in the locked position, yielding erroneous size detection (size determination).

Therefore, in the third embodiment, control is exerted so that the paper-size detecting unit 60 detects the paper size (determine the paper size) after the cassette 1 has been set in the locked position. In other words, as the configuration shown in FIG. 10 corresponds to the second embodiment, control is exerted so that the cassette 1 is first set in the locked position by turning the hoisting motor 50 downward (in the direction of the arrow M in FIG. 9A) by a predetermined magnitude, and then the paper size is detected (determined) by the paper-size detecting unit 60.

The paper size detecting mechanism according to the third embodiment can also be applied to the first embodiment. In that case, control is exerted so that the cassette 1 is first set in the locked position by the solenoid 31 of the biasing device switching on, and then the paper size is detected (determined) by the paper-size detecting unit 60.

In the third embodiment, the detecting unit 43 of the link member 40 has two notches and the paper-size detecting unit 60 has three push switches. The number of notches in the detecting unit 43 and the number of push switches of the paper-size detecting unit 60 can be increased or decreased as required. The radius of the detecting unit 43 of the link member 40 can also be set as required.

Though the present invention has been explained with reference to the a paper feeding cassette, the invention can be equally applied to any functional unit that is detachably attachable to the apparatus body such as developing unit, fixing unit, toner containing unit such as toner bottle and toner cartridge, process cartridge that includes at least image holding member, belt unit including intermediate transfer belt and transfer sheet conveying belt, writing unit that scans a photosensitive member, and double-face unit that reverses the recording sheet. By applying the present invention, any functional unit that is detachably attachable to the apparatus body can be inserted into or removed from the apparatus body without additional operating force and set in its locked position in the apparatus body.

The biasing device is set to exert a bias force as if to move any functional unit containing a consumable product (such as toner) at its maximum weight with the functional unit loaded to capacity.

The present invention has been described above with reference to the examples shown in the drawings. However, the invention is not to be thus limited. The biasing device that biases the cassette in the cassette-out direction can be configured as required within the scope of the present invention. For example, a link mechanism can be used to bias the cassette in the cassette-out direction. A motor can be used as a biasing unit with adjustable bias force. The part having the slanting surface can be configured to be slidable to bias the cassette in the cassette-out direction. In such a case, solenoid can be used as the biasing unit.

In the embodiments of the present invention, the biasing unit of the biasing device acts (switching from off to on) after the cassette is inserted. Alternatively, the biasing unit can be configured to exert a weak bias force (not enough to move the paper feeding cassette) at the time of insertion of the cassette and later exert greater bias force (enough to move the cassette). For example, in the first embodiment, the compression spring 32 can be configured to exert a bias force much weaker than that required to move the cassette 1. When the cassette 1 is inserted into the apparatus body 101, and the interior end of the cassette 1 comes in contact with the compression spring 32, as shown in FIG. 6, the bias force of the compression spring 32 alone can be made to act on the cassette 1 before the solenoid 31 is switched on. This bias force alone is not enough to move the cassette 1. Once the solenoid 31 is switched on, the arm 31a extends, and the compression of the compression spring 32 is total, the cassette 1 will be biased in the cassette-out direction by the bias force of the solenoid 31 (pushing the second stopper 26a up against the stopper surface 5a), thus setting the cassette 1 in the locked position. The same result can be achieved by replacing the solenoid 31 with a motor.

The stopper mechanism can also be configured as required within the scope of the invention. The first stopper and the second stopper that form the stopper mechanism can be provided on either the apparatus body side or the cassette side. For example, if the first stopper 5 is to be made a fixed member and the second stopper 26a is to be made a movable member (that can be moved to a control position and control release position), the fixed member (the first stopper) can be provided on the cassette side, and the movable member (the second stopper) can be provided on the apparatus body side. The second stopper can be provided on the apparatus body side such that it can be operated from the cassette by providing the movable mechanism of the second stopper on the apparatus body side (and providing only the handle on the cassette side for holding).

The paper-size detecting unit can also be configured as required within the scope of the invention. For example, the link member can be provided in the side fence instead of the end fence. The paper-size detecting unit on the apparatus body side is not limited to push switches alone and can be any suitable element.

The cassette can be fully removable from the apparatus body or otherwise.

In the embodiments of the present invention a cassette-insertion detecting unit (the cassette-insertion detecting unit 30) is provided that detects when a cassette is inserted into the apparatus body. However, the cassette-insertion detecting unit can be done away with and the solenoid or the motor can be configured to be activated when the cassette is inserted and advanced to a predetermined position in the apparatus body.

The configuration of the paper feeding cassette and the positioning member can also be altered to suit the requirement. The present invention can be applied regardless of the type of image forming apparatus or image forming method. The present invention can equally be applied to a monochrome apparatus as to a color apparatus. The image forming apparatus can be a printer or a facsimile machine, and may or may not include an image scanner or an automatic document feeder.

Apart from the image forming apparatus, the present invention can be applied to other devices and functional units that are detachably attachable to the device body. The present invention demonstrates the same effects when applied to other devices and functional units as for the image forming apparatus. That is, the functional unit can be inserted into and removed from the device body without increased operating force and is set properly in a locked position in the device body.

According to an embodiment of the present invention, when a functional unit is inserted and advanced to a predetermined position into an apparatus body, a biasing device is switched on to exert a bias force or the biasing device switches from exerting low bias force to high bias force. Consequently, the functional unit can be set in the locked position in the apparatus body without increased operating force for inserting the functional unit into and removing the functional unit from the apparatus body.

Due to the structure according to an embodiment of the present invention, the elastic member absorbs the jolts and vibrations that can potentially occur during insertion of the functional unit or when the bias force is acting, preventing any adverse effect on the functional unit, and the apparatus body.

Due to the structure according to an embodiment of the present invention, the functional unit is locked properly in position after it is inserted.

Due to the structure according to an embodiment of the present invention, the half-inserted condition of the functional unit can be detected by the unit-insertion detecting unit before any mishap can happen.

Due to the structure according to an embodiment of the present invention, the bias force of the biasing device is directed towards the position where the first stopper and the second stopper come in contact and this direction also happens to be the unit in-out direction or the movable direction of the functional unit. Consequently, the bias force does not produce any moment on the functional unit, enabling the functioning unit to be inserted without a slant, further enhancing positioning precision.

According to an embodiment of the present invention, the detachably attachable functional unit can be properly set in a locked position in the apparatus body.

Due to the structure according to an embodiment of the present invention, the paper feeding unit can be properly set in a locked position in the apparatus body.

Due to the structure according to an embodiment of the present invention, the control of the stopper mechanism is released as the handle is pulled, improving operability.

Due to the structure according to an embodiment of the present invention, positioning can be performed using the hoisting mechanism of the base plate in the functional unit. Thus, cost can be cut down by avoiding a separate biasing device. Further, a relatively large bias force can be easily realized, making it beneficial in terms of cost as well as power consumption.

Due to the structure according to an embodiment of the present invention, erroneous recording sheet size determination due to overstroke of the functional unit can be avoided, and recording sheet size can be determined accurately. Further, the control over size determination is an uncomplicated process.

Due to the structure according to an embodiment of the present invention, recording sheet size determination can be performed with a low-cost structure.

Due to the structure according to an embodiment of the present invention, the developing unit can be properly set in a locked position in the apparatus body.

Due to the structure according to an embodiment of the present invention, the fixing unit can be properly set in a locked position in the apparatus body.

Due to the structure according to an embodiment of the present invention, the toner unit can be properly set in a locked position in the apparatus body.

Due to the structure according to an embodiment of the present invention, the process cartridge including the image bearing member can be properly set in a locked position in the apparatus body.

Due to the structure according to an embodiment of the present invention, the intermediate transfer belt unit can be properly set in a locked position in the apparatus body.

Due to the structure according to an embodiment of the present invention, the transfer sheet conveying belt unit can be properly set in a locked position in the apparatus body.

Due to the structure according to an embodiment of the present invention, the writing unit can be properly set in a locked position in the apparatus body.

Due to the structure according to an embodiment of the present invention, the double-face printing unit can be properly set in a locked position in the apparatus body.

The biasing device is capable of switching or changing the bias force from off to on and vice versa when the functional unit is detached from the biasing device or attached to the biasing device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising an apparatus body, a functional unit detachably attached to the apparatus body, and a functional unit positioning device for positioning the functional unit detachably attachable to the apparatus body, comprising:

a biasing device that biases the functional unit in a unit-out direction, the biasing device including an actuator; and a stopper mechanism having a first stopper and a second stopper, the stopper mechanism exerting and releasing control over release of the functional unit, wherein the biasing device biases the functional unit so that the second stopper comes in contact with the first stopper to set the functional unit in a locked position in a unit in-out direction, and the biasing device is configured to change, using the actuator, the magnitude of a bias force on the functional unit from low to high when the functional unit is inserted and advanced up to a predetermined position into the apparatus body.

2. The apparatus according to claim 1, wherein the biasing device includes an elastic member, and a driving unit which includes the actuator biasing the elastic member in the unit-out direction so that a bias force of the driving unit acts on the functional unit via the elastic member.

3. The apparatus according to claim 1, wherein the biasing device includes an acting member which includes the actuator that is movable in the unit in-out direction and that exerts a bias force on the functional unit in contact with the functional unit, a driving unit that produces the bias force by driving the acting member, and an elastic member that is between the acting member and the driving unit.

4. The apparatus according to claim 1, further including a unit-insertion detecting unit that detects insertion of the functional unit into the apparatus body, wherein the biasing device changes the magnitude of the bias force from low to high when the unit-insertion detecting unit detects insertion of the functional unit.

5. The apparatus according to claim 4, wherein the biasing device biases the functional unit up to a position beyond the range of detection of the unit-insertion detecting unit.

6. The apparatus according to claim 1, wherein the bias force of the biasing device acts on a substantially exact position where the first stopper and the second stopper come in contact on a projection surface in the unit in-out direction.

7. An image forming apparatus, comprising:
a functional unit detachably attachable to the image forming apparatus;
a biasing device that biases the functional unit in a unit-out direction, the biasing device including an actuator; and
a stopper mechanism having a first stopper and a second stopper, the stopper mechanism exerting and releasing control over release of the functional unit, wherein
the biasing device biases the functional unit so that the second stopper comes in contact with the first stopper to set the functional unit in a locked position in a unit in-out direction, and
the biasing device is configured to change, using the actuator, the magnitude of a bias force on the functional unit from low to high when the functional unit is inserted and advanced up to a predetermined position into the image forming apparatus.

8. The image forming apparatus according to claim 7, wherein the functional unit is a paper feeding unit.

9. The image forming apparatus according to claim 8, wherein the paper feeding unit includes a handle movable in the unit in-out direction, and the stopper mechanism releases control over the release of the functional unit with a movement of the handle in the unit-out direction.

10. The image forming apparatus according to claim 8, wherein the paper feeding unit includes a base plate for loading recording sheets and thrusting up to a recording sheet feeding position, and a hoisting member for thrusting up the base plate, wherein the image forming apparatus includes a lifting mechanism for lifting the hoisting member, the lifting mechanism including a hoisting motor that drives the hoisting member, a coupling member that is movable in the unit in-out direction and that is engaged with a rotating shaft of the hoisting member, and an elastic member that biases the coupling member in the unit-out direction, wherein the coupling member is configured to have a slanting face that slants in the unit in-out direction, and exert the bias force when the hosting motor rotates the coupling member in a lowering direction of the base plate so that the slanting face pushes the rotating shaft, causing the functional unit to move in the unit-out direction, and wherein when the functional unit is inserted and advanced into the image forming apparatus, the hoisting motor rotates the coupling member in the lowering direction of the base plate by a predetermined magnitude.

11. The image forming apparatus according to claim 8, further comprising a paper size detecting device that detects the size of a recording sheet stored in the paper feeding unit, the paper size detecting device determining the size of the recording sheet after the functional unit is positioned in the image forming apparatus.

12. The image forming apparatus according to claim 11, wherein the paper size detecting device is provided in the paper feeding unit, and includes a link member that shifts according to the size of the recording sheet, and a detecting unit that detects a shift of the link member.

13. An apparatus comprising an apparatus body, a functional unit detachably attached to the apparatus body, and a functional unit positioning device for positioning the functional unit detachably attachable to the apparatus body, comprising:
a biasing device that biases the functional unit in a unit-out direction; and
a stopper mechanism having a first stopper and a second stopper, the stopper mechanism exerting and releasing control over release of the functional unit,
wherein:
the biasing device biases the functional unit so that the second stopper comes in contact with the first stopper to set the functional unit in a locked position in a unit in-out direction,
the biasing device is configured to change the magnitude of a bias force on the functional unit from low to high when the functional unit is inserted and advanced up to a predetermined position into the apparatus body, and
the biasing device includes an acting member that is movable in the unit in-out direction and that exerts a bias force on the functional unit in contact with the functional unit, a driving unit that produces the bias force by driving the acting member, and an elastic member that is between the acting member and the driving unit.

14. An apparatus comprising an apparatus body, a functional unit detachably attached to the apparatus body, and a functional unit positioning device for positioning the functional unit detachably attachable to the apparatus body, comprising:

a biasing device that biases the functional unit in a unit-out direction; and a stopper mechanism having a first stopper and a second stopper, the stopper mechanism exerting and releasing control over release of the functional unit, wherein:

the biasing device biases the functional unit so that the second stopper comes in contact with the first stopper to set the functional unit in a locked position in a unit in-out direction, and the biasing device is configured to change the magnitude of a bias force on the functional unit from low to high when the functional unit is inserted and advanced up to a predetermined position into the apparatus body, the apparatus further including a unit-insertion detecting unit that detects insertion of the functional unit into the apparatus body, wherein the biasing device changes the magnitude of the bias force from low to high when the unit-insertion detecting unit detects insertion of the functional unit.

15. The apparatus according to claim 14, wherein the biasing device biases the functional unit up to a position beyond the range of detection of the unit-insertion detecting unit.

* * * * *